(12) United States Patent
Hayashi et al.

(10) Patent No.: US 12,498,461 B2
(45) Date of Patent: Dec. 16, 2025

(54) RANGING APPARATUS

(71) Applicant: DENSO CORPORATION, Kariya (JP)

(72) Inventors: Koki Hayashi, Kariya (JP); Kunihiko Hayashi, Kariya (JP); Kouhei Tooyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 963 days.

(21) Appl. No.: 17/643,580

(22) Filed: Dec. 9, 2021

(65) Prior Publication Data

US 2022/0099810 A1    Mar. 31, 2022

Related U.S. Application Data

(63) Continuation of application No. PCT/JP2020/022906, filed on Jun. 10, 2020.

(30) Foreign Application Priority Data

Jun. 11, 2019  (JP) ................. 2019-108651

(51) Int. Cl.
*G01S 7/481*     (2006.01)
*G01S 17/931*    (2020.01)

(52) U.S. Cl.
CPC ......... *G01S 7/4817* (2013.01); *G01S 7/4814* (2013.01); *G01S 7/4816* (2013.01); *G01S 17/931* (2020.01)

(58) Field of Classification Search
USPC ..... 359/838, 840, 850, 855, 871; 356/3, 401
See application file for complete search history.

(56) References Cited

U.S. PATENT DOCUMENTS

| 5,006,721 A  | * | 4/1991  | Cameron ............ G01S 7/4817 |
|              |   |         |                      250/559.22 |
| 9,063,549 B1 | * | 6/2015  | Pennecot .............. G01S 17/93 |
| 9,529,083 B2 | * | 12/2016 | Bridges ................ G01S 7/4817 |
| 9,618,742 B1 | * | 4/2017  | Droz ..................... G02B 26/12 |
| 2017/0350966 A1 |   | 12/2017 | Hartmann et al. |
| 2018/0128902 A1 |   | 5/2018  | Popescu et al. |

(Continued)

FOREIGN PATENT DOCUMENTS

| CN | 207623512 U | 7/2018 |
| DE | 10 2016 114 064 A1 | 1/2017 |

(Continued)

*Primary Examiner* — Bumsuk Won
*Assistant Examiner* — Seth D Moser
(74) *Attorney, Agent, or Firm* — Maschoff Brennan

(57) ABSTRACT

A ranging apparatus is provided with a mirror module that rotates when being driven by a motor. The mirror module includes a pair of deflection mirrors, a mirror support member and a clip. The deflection mirrors include a narrow width portion in which a width of a reflection surface along a direction orthogonal to a rotational axis is narrower than that of other portion on the reflection surface. The mirror support member is formed in a disc shape having a shape on both surfaces thereof corresponding to a shape of the reflection surface, the deflection mirrors being disposed on the both surfaces thereof. The clip grips the deflection mirrors and the mirror support member at at least one end portion with respect to a direction orthogonal to the rotational axis between both end portions of a portion in the mirror support portion corresponding to the narrow width portion.

3 Claims, 5 Drawing Sheets

(56) References Cited

U.S. PATENT DOCUMENTS

| | | |
|---|---|---|
| 2020/0348400 A1 | 11/2020 | Toyama et al. |
| 2023/0046753 A1* | 2/2023 | Choi ...................... H02K 21/22 |
| 2023/0133767 A1* | 5/2023 | Jung ..................... G01S 7/4876 |
| | | 356/4.01 |
| 2024/0227662 A1* | 7/2024 | Behnsen ................. F21S 45/10 |
| 2025/0007343 A1* | 1/2025 | Zhu ........................ H02K 11/22 |

FOREIGN PATENT DOCUMENTS

| | | |
|---|---|---|
| JP | 2006-349449 A | 12/2006 |
| JP | 2008076449 A | 4/2008 |
| JP | 2015-129678 A | 7/2015 |
| JP | 6341500 B2 | 6/2018 |

* cited by examiner

RANGING APPARATUS

CROSS REFERENCE TO THE RELATED APPLICATIONS

This application is the U.S. bypass application of International Application No. PCT/JP2020/22906 filed on Jun. 10, 2020, which designated the U.S. and claims priority to Japanese Patent Application No. 2019-108651 filed on Jun. 11, 2019, the entire disclosure of which are incorporated herein by reference.

BACKGROUND

Technical Field

The present disclosure relates to a ranging apparatus provided with a deflecting mirror.

Description of the Related Art

A ranging apparatus that detects distance to an object by irradiating transmission waves and detecting reflection waves where the object reflects the transmission waves is known. According to the ranging apparatus, a rotatably driven deflection mirror is used for deflecting the transmission waves in the scanning, in which the outputted transmission waves are reflected at the deflection mirror and emitted towards a direction depending on a rotation speed of the deflection mirror, thereby scanning a predetermined scanning range.

SUMMARY

One aspect of the present disclosure is a ranging apparatus provided with a mirror module that rotates when being driven by a motor. The mirror module is provided with a pair of deflection mirrors, a mirror support member and a clip. The pair of deflection mirrors includes a narrow width portion in which a width of a reflection surface along a direction orthogonal to a rotational axis is narrower than that of other portion on the reflection surface. The mirror support member is formed in a disc shape having a shape on both surfaces thereof corresponding to a shape of the reflection surface, the pair of deflection mirrors being disposed on both surfaces. The clip grips the pair of deflection mirrors and the mirror support member at at least one end portion with respect to a direction orthogonal to the rotational axis between both end portions of a portion in the mirror support portion which corresponds to the narrow width portion.

DETAILED DESCRIPTION OF THE PREFERRED EMBODIMENTS

A ranging apparatus that detects distance to an object by irradiating transmission waves and detecting reflection waves where the object reflects the transmission waves is known. According to the ranging apparatus, a rotatably driven deflection mirror is used for deflecting the transmission waves in the scanning, in which the outputted transmission waves are reflected at the deflection mirror and emitted towards a direction depending on a rotation speed of the deflection mirror, thereby scanning a predetermined scanning range.

For example, Japanese translation of PCT international Application Publication No. 2018-500603 discloses a deflection mirror apparatus in a LIDAR apparatus that deflects light for the scanning. The deflection mirror apparatus includes a pair of deflection mirrors and a mirror support member in which the pair of deflection mirror is disposed on the mirror support member in an opposing side of the mirror support member.

As a result of inventor's keen research, a problem has been found in a ranging apparatus provided with a mirror module including a pair of deflection mirrors and a mirror support member. The problem is that a deflection mirror and a mirror support member are required to be easily assembled and the size of the whole mirror module is required to be smaller.

Hereinafter, exemplary embodiments of the present disclosure will be disclosed with reference to the drawings.

1. Configuration

Figure 1:
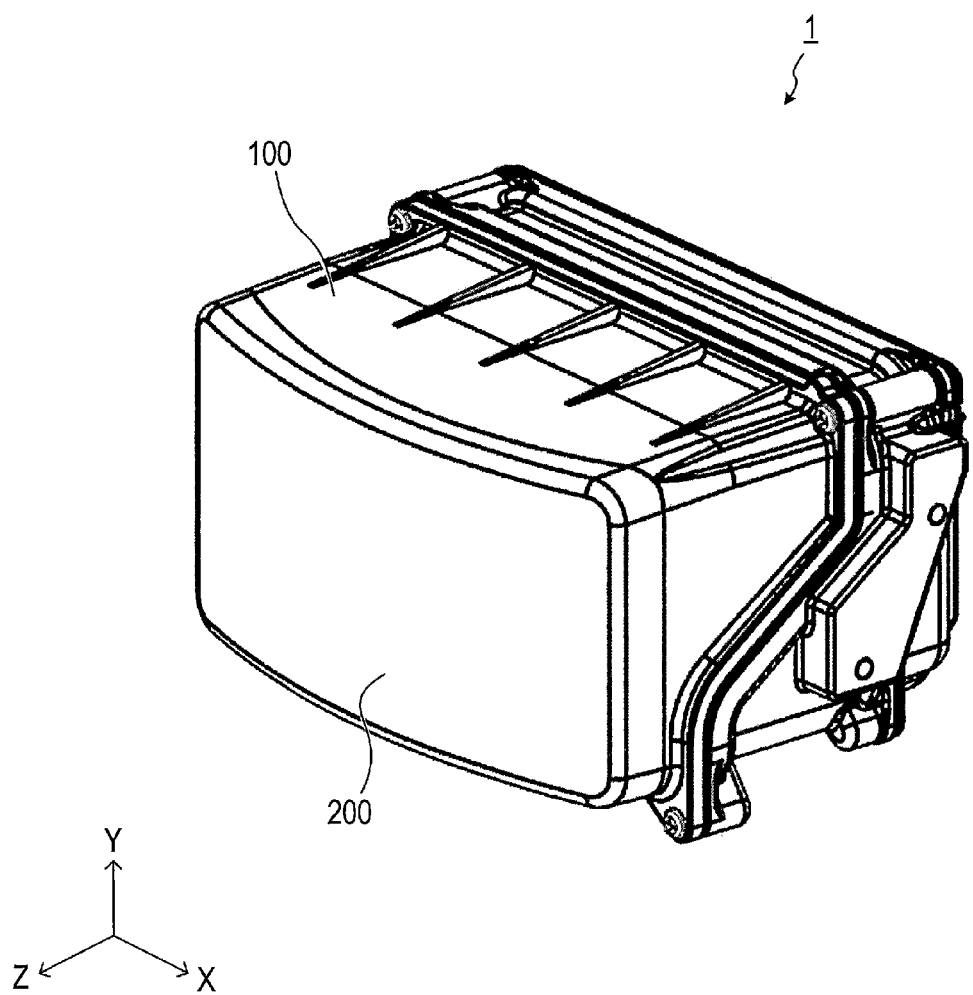
FIG. 1 is a perspective view showing an appearance of a LIDAR apparatus.

A LIDAR apparatus 1 shown in FIG. 1 emits light and receives reflected light thereof, thereby measuring a distance to an object as a ranging apparatus. The LIDAR apparatus 1 is mounted on a vehicle and used for detecting various objects existing ahead of the vehicle. LIDAR is an abbreviation of Light Detection and Ranging.

As shown in FIG. 1, the LIDAR apparatus 1 is provided with a housing 100 and an optical window 200. The housing 100 is configured of a box body made of resin and formed in rectangular parallelopiped shape in which on surface is opened.

Hereinafter, a direction along the longitudinal direction of an opening portion having a substantially rectangular shape in the housing 100 is defined as X axis direction, a direction along a short direction of the opening portion is defined as Y direction and a direction orthogonal to a X-Y plane is defined as Z axis direction. Note that the left-right side in the X axis direction and upper-lower side in the Y axis direction are defined as when viewed from an opening portion side of the housing in a state where the LIDAR apparatus 1 is mounted on the vehicle. Also, the front-back side in the Z axis direction is defined in which a front side is an opening portion side of the housing 100 and a back side is a depth side of the housing 100.

Figure 2:
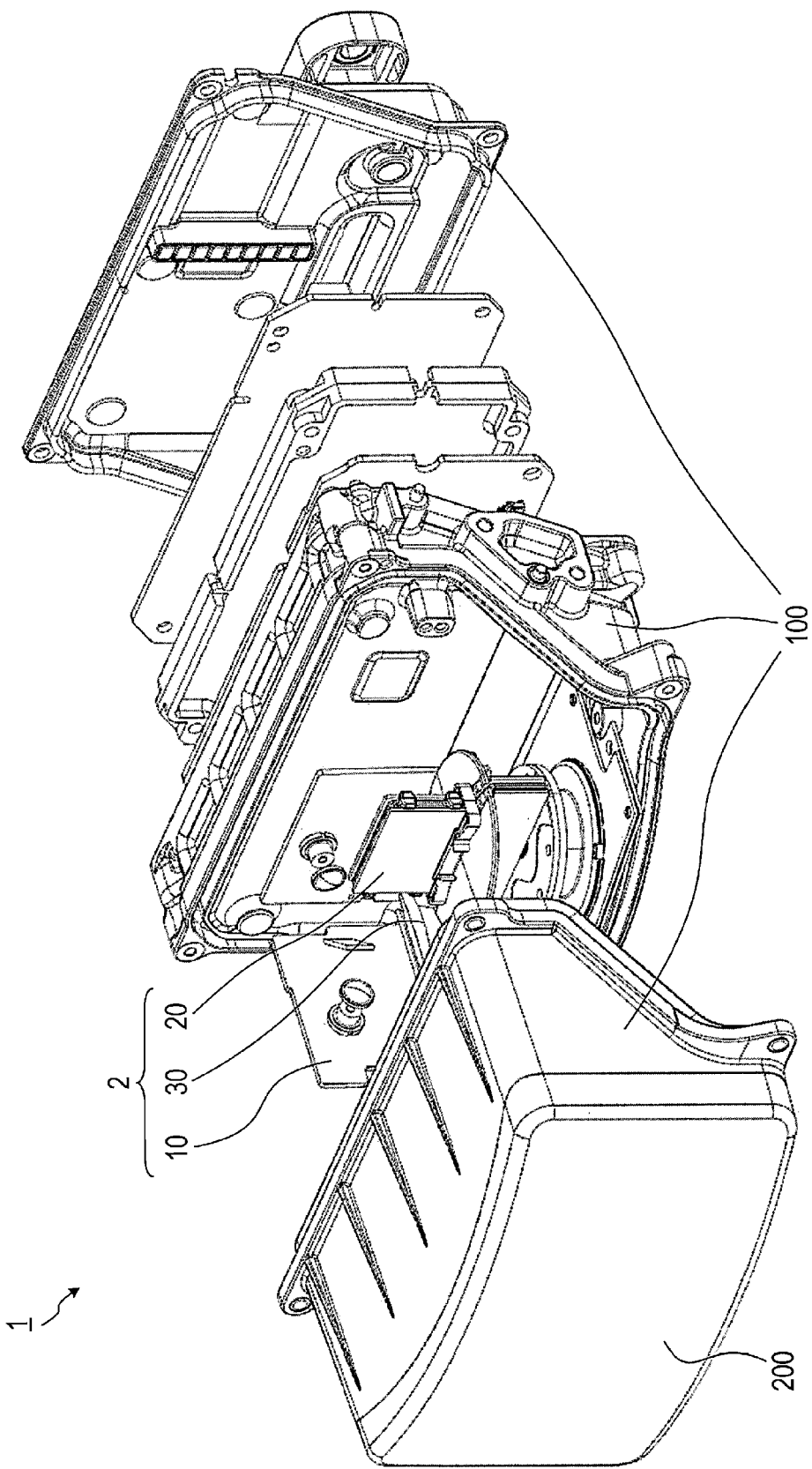
FIG. 2 is an exploded perspective view showing the LIDAR apparatus.

As shown in FIG. 2, a light detection module 2 is accommodated inside the housing 100. The light detection module 2 is provided with a light projection unit 10, a scanning unit 20 and a light reception unit 30.

Hereinafter, a configuration of the light detection module 2, in particular, a configuration of a mirror module 21 will be described in detail.

2. Scanning Unit

Figure 3:
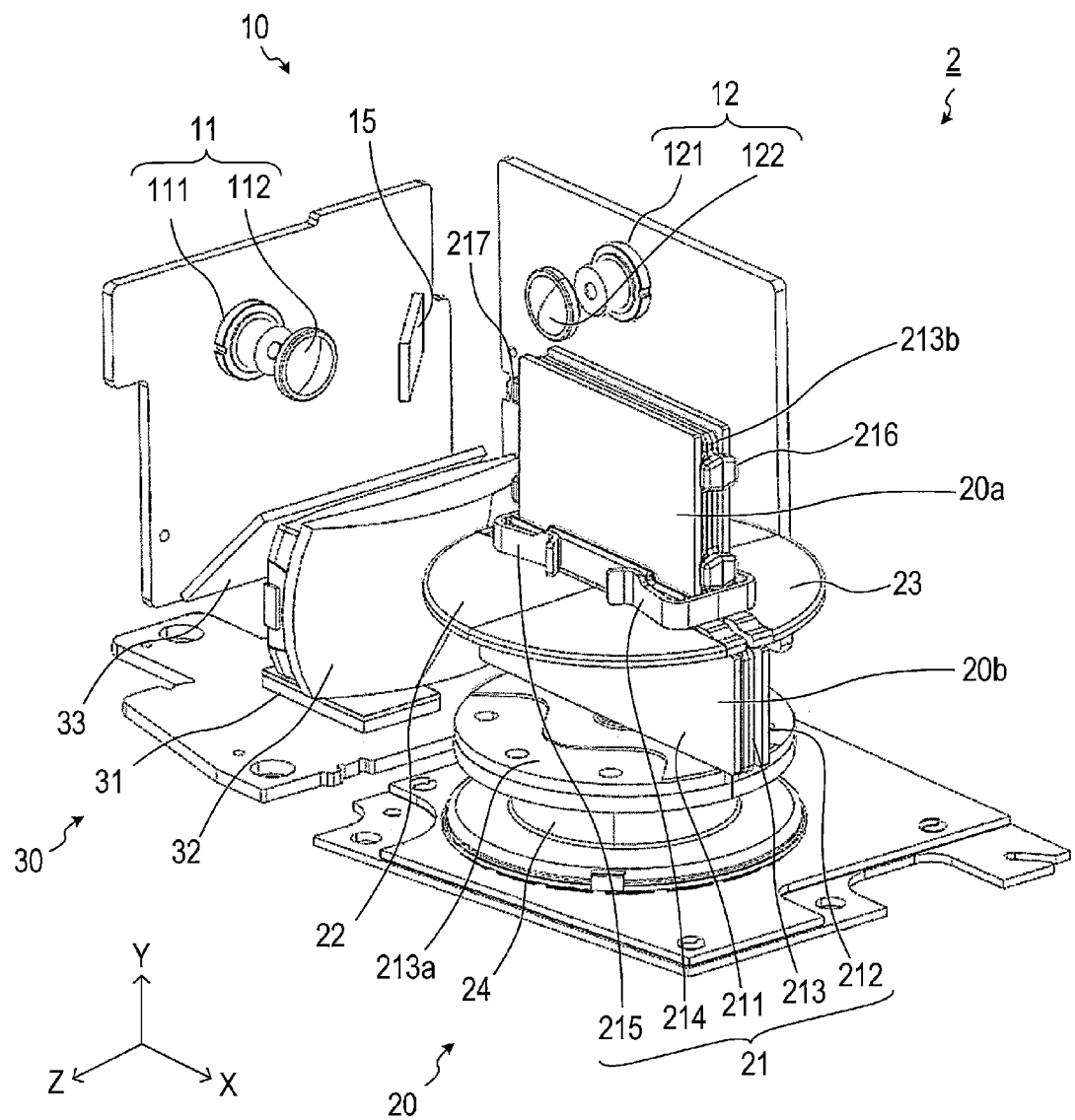
FIG. 3 is a perspective view showing a configuration of a light detection module accommodated in the LIDAR apparatus.
Figure 4:
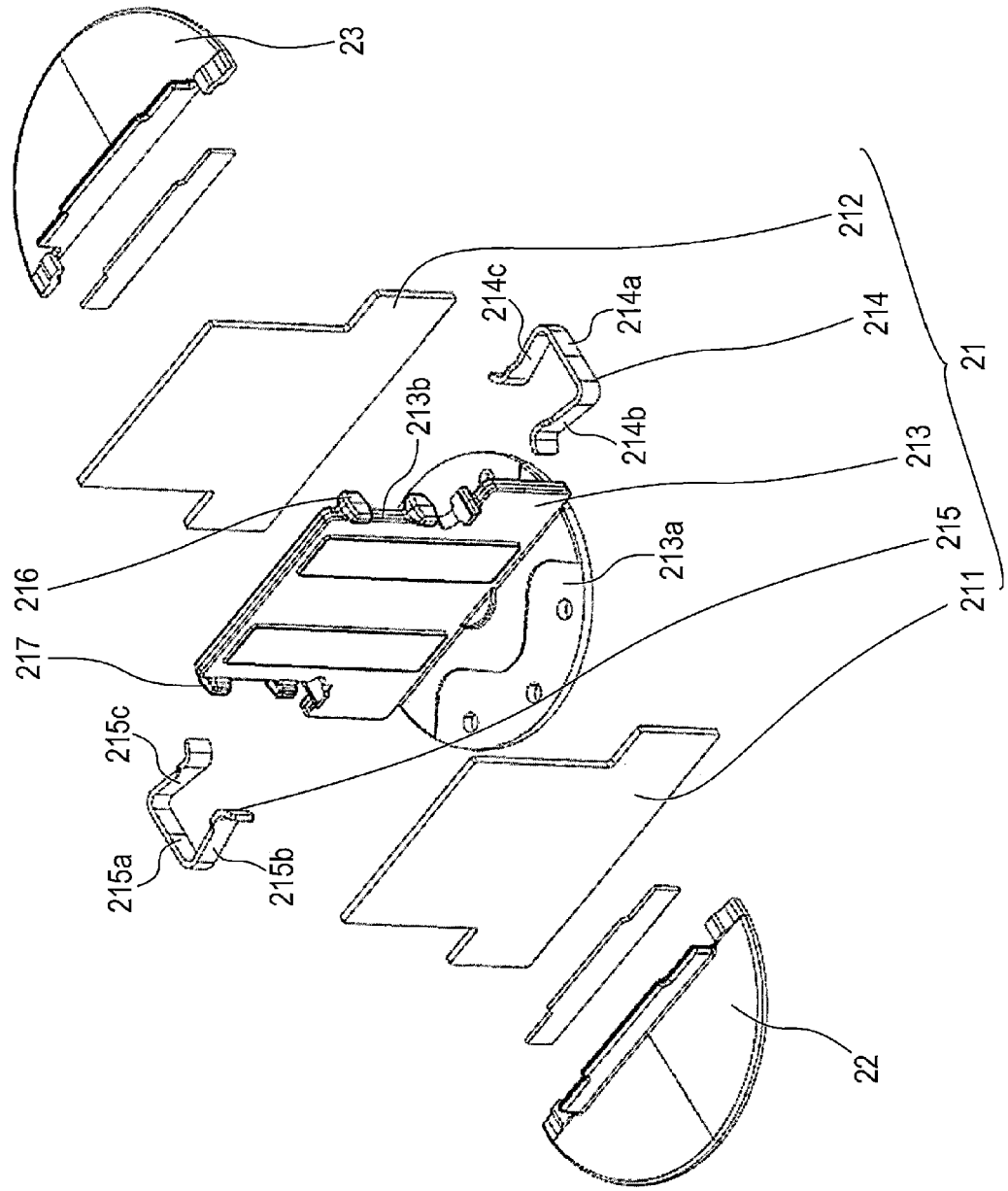
FIG. 4 is an exploded view showing a mirror module and a partition plate in a scanning unit.

As shown in FIGS. 3 and 4, the scanning unit 20 is provided with the mirror module 21, a pair of partitioning plates 22 and 23, and a motor 24. The mirror module 21 is disposed standing on the motor 24, and the mirror module 21 and the pair of partitioning plates 22 and 23 fixed to the mirror module 21 rotate around the rotational axis indicated by the one dot chain line in FIG. 5 when being driven by the motor 24.

3. Mirror Module and Partitioning Plate

The mirror module 21 is provided with a pair of deflection mirrors 211 and 211, a mirror support member 213 and a pair of clips 214 and 215.

The pair of deflection mirrors 211 and 212 each serves as a flat plate-like member having a reflection surface that reflects light.

The mirror support member 213 is provided with a disc portion 213a and an installation member 213b. The disc portion 213a is a member having a circular plate shape, of which the center of the circle is fixed to a rotary shaft of the motor 24. The installation member 213b is a plate-like member to which the pair of deflection mirrors 211 and 212 are installed on both sides thereof, the installation member 213b standing up on a circular surface of the disc member 213a.

The pair of deflection mirrors 211 and 212 are formed having a shape integrating two rectangles having different widths in the longitudinal direction. Specifically, the shape is that a first rectangle and a second rectangle of which the longitudinal width is longer than that of the first rectangle are arranged along a common center axis where center axes along short directions of respective rectangles are aligned, thereby integrating both rectangles. Hereinafter, in the pair of deflection mirrors 211 and 212, a portion corresponding to the first rectangle is referred to as a narrow width portion, and a portion corresponding to the second rectangle is referred to as a wide width portion.

The shape of an installation surface of the pair of deflection mirrors 211 and 213 in the installation member 213b corresponds to the shape of the pair of deflection mirrors 211 and 212. The installation member 213b is provided with a pair of guides 216 and 217 on both side surfaces with respect to the rotational axis in a portion corresponding to the narrow width portion.

The pair of guides 216 and 217 are protrusions that protrude towards both of the pair of deflection mirrors 211 and 212 from both side surfaces with respect to the rotational axis in a portion corresponding to the narrow width portion of the installation member 213b. The pair of guides 216 and 217 contact the pair of deflection mirrors 211 and 213 at both sides of the narrow width portion in a direction orthogonal to the rotational axis and regulate a movement of the pair of deflection mirrors on the reflection surface in a direction orthogonal to the rotational axis.

As shown in FIG. 4, the clip 214 is formed in U-shape including a base portion 214a and a pair of grip members 214b and 214c extending from the base portion 214a. The clip 214 is configured such that the pair of grip portions 214b and 214c grip the pair of deflection mirrors 211 and 212 and the installation member 213b at the end portions of the narrow width portions in a direction orthogonal to the rotational axis of the pair of deflection mirrors 211 and 212. The clip 215 is formed in the same shape as that of the clip 214 including a base portion 215a and a pair of grip member 215b and 215c extending from the base portion 215a. The clip 215 is disposed at an end portion which is opposite to the clip 214 in the both end portions of the narrow width portions in a direction orthogonal to the rotational axis of the pair of deflection mirrors 211 and 212.

Figure 5:
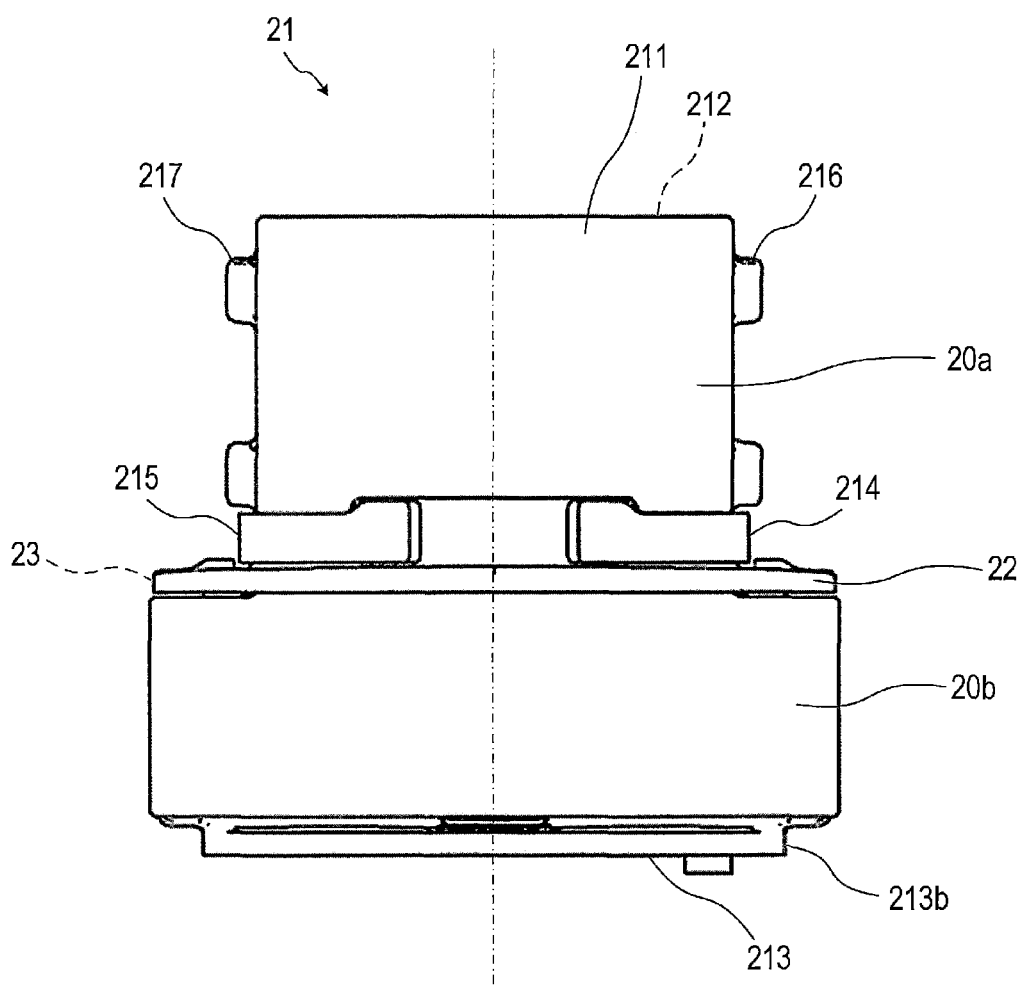
FIG. 5 is a diagram showing the mirror module when viewed from a reflection surface side of one deflection mirror.

FIG. 5 shows a state where the pair of clips 214 and 215 grip the pair of deflection mirrors 211 and 212, and the installation member 213b. The pair of clips 214 and 214 and the guides 216 and 217 are positioned inside the width of the wide width portion in the longitudinal direction of the pair of deflection mirrors 211 and 212.

The pair of partitioning plates 22 and 23 are configured such that a plate member formed in a circular and plate shape, where the diameter thereof is the same as the width in the longitudinal direction of the wide width portion in the pair of deflection mirrors 211 and 211, is divided into two semicircular members. The pair of partitioning plates 22 and 23 are fixed to the mirror module 21 in a state where the narrow width portions of the pair of deflection mirrors 211 and 212 are put between the pair of portioning plates 22 and 23, and the pair of portioning plates 22 and 23 contact a step portion between the wide width portion and the narrow width portion of the pair of deflection mirrors 211 and 212.

Hereinafter, as shown in FIGS. 3 and 5, a portion positioned at upper side of the pair of portioning plates 22 and 23 in the pair of deflection mirrors 211 and 212, that is, a portion in the narrow width portion side, is referred to as a projection deflection portion 20a. Further, a portion positioned at lower side of the pair of partitioning plates 22 and 23 in the pair of deflection mirrors 211 and 212, that is, a portion in the wide width portion side is referred to as a light receiving deflection portion 20b.

4. Light Projection Unit

As shown in FIG. 3, the light projection unit 10 is provided with a pair of light emission modules 11 and 12. The light projection unit 10 may be provided with a light projection reflection mirror 15.

The light emission module 11 is provided with a light source 111 and a light emission lens 112, which are disposed facing each other. For the light source 111, a semiconductor laser device is used. The light emission lens 112 reduces a width of the beam emitted from the light source 111. Similarly, the light emission module 12 is provided with a light source 121 and a light emission lens 122. Since the light emission module 12 is the same as that light emission module 11, the explanation thereof is omitted.

The light projection reflection mirror 15 is configured to change the travelling direction of light.

The light emission module 11 is disposed allowing the light outputted from the light emission module 11 to be directly incident on the projection deflection portion 20a.

The light emission module 12 disposed such that the light projection reflection mirror 15 changes the travelling direction of the light outputted from the light emission module 12 by approximately 90 degrees to be incident on the projection deflection unit 20a.

Here, the light emission module 11 is disposed to output the light towards right side from the left side in the X axis direction, and the light emission module 12 is disposed to output the light towards front side from rear side in the Z axis direction. Further, the light projection reflection mirror 15 is disposed such that the path of light travelling towards the projection deflection portion 20a from the light emission module 11 is not disturbed.

5. Light Reception Unit

The light reception unit 30 is provided with a light receiving element 31. The light reception unit 30 may include a light receiving lens 32 and a light receiving reflection mirror 33.

The light receiving element 31 includes an APD array in which a plurality of APDs are arranged in a row. APD is an abbreviation of avalanche photo diode.

The light receiving lens 32 focuses the light coming from the light reception deflection unit 20b.

The light receiving reflection mirror 33 is disposed in the left side in the X axis direction of the light receiving lens 32, and changes the travelling direction of the light. The light receiving element 31 is disposed in a lower portion of the light receiving reflection mirror 33.

The light receiving reflection mirror 33 is disposed such that the path of light is bent downward by approximately 90 degrees whereby the light being incident via the light receiving lens 32 from the light reception deflection unit 20b arrives the light receiving lens 31.

The light receiving lens 32 is disposed between the light reception deflection unit 20b and the light receiving reflection mirror. The light receiving lens 32 focuses the diameter of light beam incident on the light receiving element 31 to be approximately the same as the element width of the APD.

6. Operation of Light Detection Module

The light outputted from the light emission module 11 is incident on the projection deflection portion 20a. Further, the travelling direction of the light outputted from the light emission module 12 is bent at the light projection reflection mirror 15 by approximately 90 degrees and is incident on the projection deflection portion 20a. The light being incident on the projection deflection portion 20a is emitted towards a direction depending on the rotation angle of the mirror module 21 via the optical window 200. A range to which the light is irradiated via the mirror module 21 is referred to as a scanning range. For example, a range spreading at ±60 degrees along the X axis direction where the front direction along the Z axis is defined as 0 degree, can be the scanning range.

The reflected light from an object positioned in a predetermined direction depending on the rotational position of the mirror module 21, that is, the emission direction of the light from the projection deflection portion 20a, transmits through the optical window 200 and is reflected at the light receiving deflection portion 20b. Then, the reflected light is received by the light receiving element via the light receiving lens 32 and the light receiving reflection mirror 33.

7. Effects and Advantages

According to the above-described detailed embodiments, the following effects and advantages can be obtained.

(7a) In the LIDAR apparatus 1, the pair of deflection mirrors 211 and 212 and the mirror support member 213 are gripped by the clips 214 and 215 at both ends of the narrow width portions in a direction orthogonal to the rotational axis of the pair of deflection mirrors 211 and 212. According to this configuration, the pair of deflection mirrors 211 and 212, and the mirror support member 213 can readily be assembled by the clips 214 and 215 being put therebetween and supporting them. Further, the clips 214 and 214 are disposed in the narrow width portion according to the present embodiment, thereby preventing the clips from protruding from the deflection mirror. Hence, an increase in the outer dimension of the whole mirror module 21 can be reduced, and the whole size of the mirror module 21 can be downsized.

(7b) In the LIDAR apparatus 1, the installation member 213b is provided with a pair of guides 216 and 217 protruding from both side surfaces with respect to the rotational axis in a portion corresponding to the narrow width portion towards both of the pair of deflection mirrors 211 and 212. The pair of guides 216 and 217 regulate a movement of the pair of deflection mirrors on the reflection surface in a direction orthogonal to the rotational axis. According to this configuration, since the pair of deflection mirrors 211 and 212 can be prevented from being shifted on the reflection surface in a direction orthogonal to the rotational axis, the pair of deflection mirrors 211 and 212 and the mirror supporting member 213 can readily be assembled. Further, since the pair of guides 216 and 217 are disposed in a portion corresponding to the narrow width portion of the installation member 213b, thereby reducing an increase in the outer dimension of the whole mirror module 21 can be reduced, the size of the whole mirror module 21 can be downsized.

(7c) In the LIDAR apparatus 1, the narrow width portion of the pair of deflection mirrors 211 and 212 are formed in either one side between both sides of the reflection surface with respect to a direction parallel to the rotational axis. The pair of deflection mirrors 211 and 212 has a shape in which a first rectangle and a second rectangle of which the longitudinal width is longer than that of the first rectangle are arranged along a common center axis where center axes along short directions of respective rectangles are aligned, thereby integrating both rectangles. A portion corresponding to the first rectangle is the narrow width portion. Thus, the shape of the pair of deflection mirrors can be simplified. Therefore, the pair of deflection mirrors 211 and 212 and the mirror supporting member 213 can readily be manufactured, and they can readily be assembled.

Further, in the LIDAR apparatus 1, a beam of the light outputted from the light projection unit 10 and incident on the projection deflection unit 20a is punctiform, reflected at about center portion of the projection deflection unit 20a and emitted. In contrast, the beam of the reflected light from the object is spread, and is reflected at the whole light reception deflection unit 20b, and the diameter of the beam is focused to be an appropriate width for being incident on the light receiving element by the light receiving lens 32. Hence, even when the width of the projection deflection unit 20a is narrowed, the emission light is less affected by the narrowed width. However, when the width of the light reception deflection unit 20b is narrowed, since an amount of light of the reflected light is reduced, the reflected light may be unlikely to be detected.

According to the present embodiment, the narrow width portion is formed in the projection deflection portion 20a, ranging accuracy is less affected. Further, occurrence of ghost, which is produced by reflecting transmission waves in a direction different from the reflection direction at the end portion of the projection deflection unit 20a, can be reduced.

According to the present embodiment, the light projection unit 10 corresponds to a transmission unit, the light reception unit 30 corresponds to a reception unit, the projection deflection unit 20a corresponds to a transmission deflection unit and the light receiving deflection portion 20b corresponds to a reception deflection unit.

8. Other Embodiments

The embodiments of the present disclosure were described so far. The present disclosure is not limited to the above-described embodiments and apparently can be modified in various manners.

(8a) In the above-described embodiments, an example is described in which the pair of deflection mirrors 211 and 212 and the mirror support member 213 are gripped by the clips 214 and 215 at both ends of the narrow width portions in a direction orthogonal to the rotational axis of the pair of deflection mirrors 211 and 212. However, the pair of deflection mirrors 211 and 212 and the mirror support member 213 may be gripped by the clips at one end of the both ends.

(8b) According to the above-described embodiments, all of portions of the pair of clips 214 and 215, and the pair of guides 216 and 217 are positioned within the width in the longitudinal direction of the wide width portion of the pair of deflection mirror 211 and 212. However, a part of portions of the pair of clips 214 and 215, and the pair of guides 216 and 217 may be positioned outside the width in the longitudinal direction of the wide width portion.

(8c) According to the above-described embodiments, the pair of deflection mirrors 211 and 212 are formed having a shape integrating two rectangles having different widths in the longitudinal direction. Specifically, the shape is that a first rectangle and a second rectangle of which the longitudinal width is longer than that of the first rectangle are arranged along a common center axis where center axes along short directions of respective rectangles are aligned, thereby integrating both rectangles. However, it is not limited to the above-described shape as long as the pair of deflection mirrors have the narrow width portions. For example, the pair of deflection mirrors 211 and 212 may be formed to have a narrow width portion positioned between a wide width portion and a wide width portion.

(8d) According to the above-described embodiments, an upper side portion with respect to the pair of partitioning plates 22 and 23 is the projection deflection portion 20a and a lower side portion thereof is the light receiving deflection portion 20b in the pair of deflection mirrors 211 and 212. However, the LIDAR apparatus 1 may be configured such that the upper side portion is the light receiving deflection portion 20b and the lower side portion may be the projection deflection portion 20a.

(8e) According to the above-described embodiments, the LIDAR apparatus 1 is exemplified as a ranging apparatus. However, the type of the ranging apparatus is not limited thereto. For example, the ranging apparatus may be configured of a millimeter wave radar apparatus or the like.

(8f) The functions of a single constituent in the above-described embodiment may be distributed to multiple constituents, or the functions of a plurality of constituents may be integrated to a single constituent. A part of the configuration in the above-described embodiments may be omitted. Also, a part of the configuration in the above-described embodiments may be added to or replaced with the configuration of the above-described embodiments. One aspect of the present disclosure is to provide a technique for easily assembling a deflection mirror and the mirror support member and for reducing the size of the whole mirror module.

CONCLUSION

The present disclosure is to provide a technique for easily assembling a deflection mirror and the mirror support member and for reducing the size of the whole mirror module.

A one aspect of the present disclosure is a ranging apparatus provided with a mirror module that rotates when being driven by a motor. The mirror module is provided with a pair of deflection mirrors, a mirror support member and a clip. The pair of deflection mirrors includes a narrow width portion in which a width of a reflection surface along a direction orthogonal to a rotational axis is narrower than that of other portion on the reflection surface. The mirror support member is formed in a disc shape having a shape on both surfaces thereof corresponding to a shape of the reflection surface, the pair of deflection mirrors being disposed on both surfaces. The clip grips the pair of deflection mirrors and the mirror support member at at least one end portion with respect to a direction orthogonal to the rotational axis between both end portions of a portion in the mirror support portion which corresponds to the narrow width portion.

According to such a configuration, the pair of deflection mirrors and the mirror support member can readily be assembled by the clip being put therebetween and supporting them. Further, when disposing the clip, a problem arises that the outer dimension of the whole mirror module becomes larger because the clip protrudes from the deflection mirror. However, since the clip is disposed in the narrow width portion, an increase in the outer dimension as a whole mirror module can be reduced.

Thus, the deflection mirror and the mirror support member can readily be assembled and a size of the while mirror module can be downsized.

What is claimed is:
1. A ranging apparatus comprising:
a mirror module that rotates when being driven by a motor,
wherein
the mirror module comprises:
 a pair of deflection mirrors having a narrow width portion in which a width of a reflection surface along a direction orthogonal to a rotational axis is narrower than that of an other portion on the reflection surface;
 a mirror support member having a first portion formed in a disc shape and a second portion having a shape that corresponds to a shape of the reflection surface of the pair of deflection mirrors, each of the pair of deflection mirrors being disposed on a first side and a second side of the second portion of the mirror support member; and
 a clip that grips the pair of deflection mirrors and the mirror support member at an at least one end portion with respect to the direction orthogonal to the rotational axis, the clip being positioned on a portion in the mirror support member which corresponds to the narrow width portion,
wherein
the mirror support member is provided with a pair of guides,
each of the pair of guides are formed as a protrusion disposed on the first side and the second side of the second portion of the mirror support member and correspond to the narrow width portion in the mirror support member,
each protrusion is configured to regulate a position of the respective deflection mirror with respect to the direction orthogonal to the rotational axis.
2. A ranging apparatus comprising:
a transmission unit configured to output transmission waves; and
a reception unit configured to detect reflection waves from an object to which the transmission waves are irradiated;
a mirror module that rotates when being driven by a motor,
wherein
the mirror module comprises:
 a pair of deflection mirrors having a narrow width portion in which a width of a reflection surface along a direction orthogonal to a rotational axis is narrower than that of an other portion on the reflection surface;

a mirror support member having a first portion formed in a disc shape and a second portion having a shape that corresponds to a shape of the reflection surface of the pair of deflection mirrors, each of the pair of deflection mirrors being disposed on a first side and a second side of the second portion of the mirror support member; and a clip that grips the pair of deflection mirrors and the mirror support member at an at least one end portion with respect to the direction orthogonal to the rotational axis, the clip on a portion in the mirror support member which corresponds to the narrow width portion, wherein:

the narrow width portion is formed between sides of the pair of deflection mirrors with respect to a direction parallel to the rotational axis;

each of the pair of deflection mirrors comprises a first region and a second region, the first region comprising a transmission deflection unit as a portion positioned in a transmission unit side, and the second region comprising a reception deflection unit as a portion positioned in a reception unit side; and the narrow width portion is formed in the transmission deflection unit.

3. A ranging apparatus comprising:

a transmission unit configured to output transmission waves toward an object;

a reception unit configured to detect reflection waves that are reflected from the object; and a mirror module configured to be driven by a motor and to rotate about a rotational axis, the mirror module configured to reflect the transmission waves output from the transmission unit toward the object and reflect the reflection waves that are reflected from the object to the reception unit, the mirror module comprising a deflection mirror comprising a narrow width portion and a wide width portion, the narrow width portion being narrower than the wide width portion in a direction orthogonal to the rotational axis, wherein the narrow width portion reflects the transmission waves output from the transmission unit toward the object.

* * * * *